S. ABE.
SAFETY STARTING CLUTCH FOR MOTOR VEHICLES.
APPLICATION FILED DEC. 20, 1919.
1,395,243.
Patented Nov. 1, 1921.
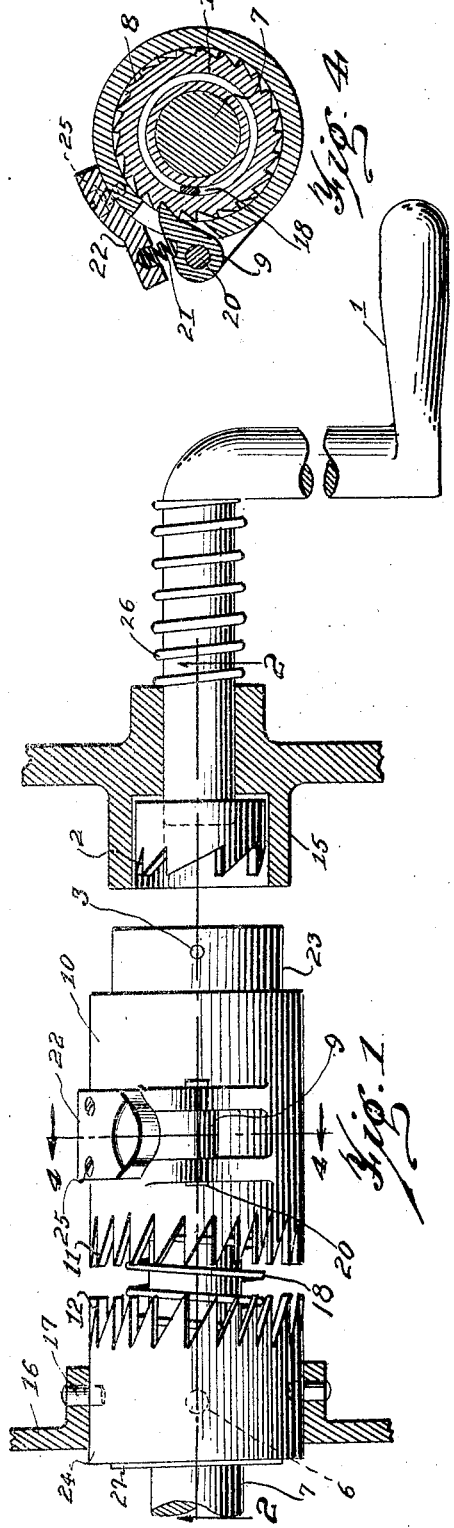
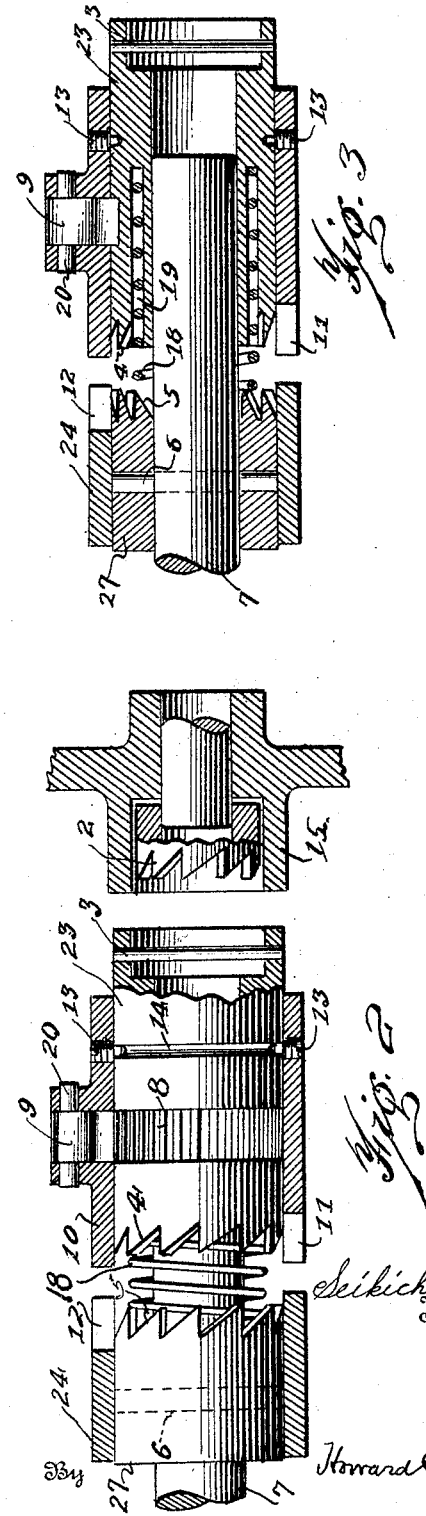

UNITED STATES PATENT OFFICE.

SEIKICHI ABE, OF HIGHLAND PARK, MICHIGAN.

SAFETY STARTING-CLUTCH FOR MOTOR-VEHICLES.

1,395,243.　　　Specification of Letters Patent.　　Patented Nov. 1, 1921.

Application filed December 20, 1919. Serial No. 346,421.

*To all whom it may concern:*

Be it known that I, SEIKICHI ABE, a subject of the Emperor of Japan, of Highland Park, in the county of Wayne and State of Michigan, have invented a certain new and useful device, known as a Safety Starting-Clutch for Motor-Vehicles, of which the following is a specification.

My invention relates to a safety device for starting motor vehicles. With this new device the cranking handle disengages instantly from the crank shaft whenever the motor starts, or back firing occurs, making it absolutely safe for the operator when starting the motor.

Another feature of my invention is that the cranking handle is set free from the safety device when not in use, making it impossible to inflict damage upon the safety device by striking the cranking handle accidentally.

Another feature of my invention is that the most important working parts, such as ratchet wheel, dog and springs, are protected by a strong shell case.

Other and further features are thoroughly set forth in the following description, and the invention will be more particularly pointed out in the appended claims.

In the drawing—Figure 1 is the side elevation. Fig. 2 is a longitudinal cross section taken on the line 2—2 of Fig. 1. Fig. 3 is a similar view showing the inside clutch in section. Fig. 4 is a section view through 4—4 of Fig. 1.

The reference numeral 7 denotes an engine shaft and fixed on said shaft by a pin 6 is an inner rear clutch member 27 having its forward end provided with a series of clutch teeth or jaws 5. This clutch member is rotatable in a rear outer clutch member 24 fixed by a pin 17 in a suitable stationary bearing 16, said rear outer clutch member having a series of clutch teeth or jaws 12.

The engine shaft 7 protrudes from the rear inner clutch member 27 and slidable on the outer end of said shaft and adapted to rotate thereon is a front inner clutch member 23 which has its inner end provided with a series of teeth or clutch jaws 4 adapted to interlock with the teeth or jaws 5 of the rear inner clutch member 27, so that the front clutch member may rotate the rear clutch member clockwise or recede counter-clockwise relative to the rear clutch member. In the front end of the inner clutch member 23 is a socket and a transverse pin 3, said socket providing clearance for the toothed head 2 of a starting crank 1 rotatable and reciprocable in a suitable bearing 15. The starting crank 1 may have its head 2 pushed into the socket of the front inner clutch member 23 for engagement with the pin 3, and said crank can be turned clockwise to impart a similar movement to the clutch member 23. When the starting crank 1 is released a spring 26 retracts said starting crank.

The front inner clutch member 23 has its periphery provided with an annular groove 14 and a series of ratchet teeth 8, and the inner end of said clutch member has an annular pocket 19 for a coiled expansion spring 18, which encircles the engine shaft 7 between the rear and front inner clutch members.

Rotatable on the front inner clutch member 23 is a front outer clutch member 10 having a screw 13 or similar means extending into the annular groove 14 of the clutch member 23, so that said inner and outer clutch members may reciprocate together. The inner end of the front outer clutch member 10 has a series of teeth or jaws 11 adapted to interlock with the teeth or jaws 12 of the rear outer clutch member 24 whereby this clutch member may temporarily hold the front outer clutch member 10 stationary.

The front outer clutch member 10 has opposed lugs connected by a pivot pin 20 and on said pin is a pawl extending through an opening in the front outer clutch member 10 to engage the series of ratchet teeth 8 of the front inner clutch member 23.

Mounted on the front outer clutch member 10 by screws 25 or other fastening means is a bracket 22 and interposed between said bracket and the pawl 9 is a coiled expansion spring 21. The expansive force of this spring holds the pawl normally in engagement with the ratchet teeth 8 of the front inner clutch member 23.

In operation, the starting crank 1 is pushed rearwardly until it is interlocked with the forward end of the front inner clutch member 23 and further rearward movement of said starting crank causes both of the front clutch members to be shifted rearwardly, against the action of the spring 18, until the teeth or jaws of all of the clutch members are interlocked. By then swinging the crank 1 in a clockwise direction the engine shaft 7 may be turned over, since the crank is interlocked with the front inner clutch member 27 and said clutch member interlocked with the rear inner clutch member 27 for clockwise rotation. During this operation the front outer clutch member 10 is held stationary with the ratchet teeth 8 moving under the spring pressed pawl 9 which recedes.

Should there be a counter-clockwise rotation of the engine shaft 7, due to "back fire" of the engine, the ratchet mechanism between the front, inner and outer clutch members is immediately brought into action; the ratchet teeth 8 through the medium of the pawl 9 causing the front outer clutch member 10 to rotate counter-clockwise and under the influence of the spring 18 the front outer clutch member 10 moves forwardly and is automatically disengaged from the rear outer clutch member 24. Since the front outer clutch member is connected to the front inner clutch member to reciprocate therewith, it is obvious that the front inner clutch member 23 will be shifted out of engagement with the rear inner clutch member 27 and consequently the front clutch members become inactive.

The manner in which the rear and front clutch members are interlocked permits of the front clutch members being automatically released when the speed of the engine shaft 7 exceeds that of the starting crank 1.

What I claim is:—

1. In a safety starting clutch for motor vehicles, the combination with an engine shaft and a starting crank for turning over said engine shaft; of a bearing, a rear outer clutch member fixed in said bearing, a rear inner clutch member fixed on said engine shaft and journaled in said rear outer clutch member, a front inner clutch member loose on said engine shaft and adapted to be engaged by said starting crank and shifted rearward to interlock with and turn said rear inner clutch member when said starting crank is pushed rearwardly and turned in a clockwise direction, a coiled expansion spring encircling said engine shaft between said rear and front inner clutch members to maintain said members normally separated, a front outer clutch member rotatable on said front inner clutch member and held for longitudinal movement therewith to interlock with said rear outer clutch member and be temporarily held stationary thereby, and a ratchet mechanism associated with said front inner and outer clutch members permitting of said front inner clutch being turned clockwise by said starting crank while said front outer clutch member is held by said rear outer clutch member, said ratchet mechanism causing said front inner and outer clutch members to rotate counter-clockwise together and recede under the action of said spring from said rear inner and outer clutch members when said engine shaft rotates counterclockwise.

2. The combination set forth in claim 1 wherein said ratchet mechanism includes a spring pressed pawl carried by and extending through said front outer clutch member to engage a series of ratchet teeth on said front inner clutch member.

In testimony whereof I have hereunto affixed my signature.

SEIKICHI ABE.